United States Patent
Muenchausen et al.

(10) Patent No.: US 6,559,413 B1
(45) Date of Patent: May 6, 2003

(54) METHOD FOR LASER MACHINING EXPLOSIVES AND ORDNANCE

(75) Inventors: Ross E. Muenchausen, Espanola, NM (US); Thomas Rivera, Santa Fe, NM (US); John A. Sanchez, Los Alamos, NM (US)

(73) Assignee: The Regents of the University of California, Los Alamos, NM (US)

(*) Notice: Subject to any disclaimer, the term of this patent is extended or adjusted under 35 U.S.C. 154(b) by 0 days.

(21) Appl. No.: 09/995,922

(22) Filed: Nov. 28, 2001

(51) Int. Cl.[7] ............................................. B23K 26/00
(52) U.S. Cl. ............................................. 219/121.72
(58) Field of Search ............. 219/121.72, 121.68, 219/121.69, 121.6, 121.61, 121.67, 121.78, 121.79

(56) References Cited

U.S. PATENT DOCUMENTS

| | | | |
|---|---|---|---|
| 3,597,578 A | 8/1971 | Sullivan et al. | 219/121 L |
| 3,601,576 A | 8/1971 | der Aare et al. | 219/121 L |
| 3,749,878 A | 7/1973 | Sullivan et al. | 219/121 L |
| 3,965,328 A | 6/1976 | Locke | 219/121 LM |
| 4,010,345 A | 3/1977 | Banas et al. | 219/121 L |
| 4,870,244 A * | 9/1989 | Copley et al. | 219/121.7 |
| 4,898,095 A * | 2/1990 | Tasaki et al. | 102/201 |
| 5,120,926 A | 6/1992 | Marriott | 219/121.67 |
| 5,734,146 A | 3/1998 | La Rocca | 219/121.72 |
| 5,760,368 A | 6/1998 | Nakata | 219/121.72 |
| 6,150,630 A | 11/2000 | Perry et al. | 219/121.68 |
| 6,285,002 B1 * | 9/2001 | Ngoi et al. | 219/121.73 |

* cited by examiner

*Primary Examiner*—Tom Dunn
*Assistant Examiner*—Jonathan Johnson
(74) *Attorney, Agent, or Firm*—Samuel L. Borkowsky

(57) ABSTRACT

Method for laser machining explosives and related articles. A laser beam is directed at a surface portion of a mass of high explosive to melt and/or vaporize the surface portion while directing a flow of gas at the melted and/or vaporized surface portion. The gas flow sends the melted and/or vaporized explosive away from the charge of explosive that remains. The method also involves splitting the casing of a munition having an encased explosive. The method includes rotating a munition while directing a laser beam to a surface portion of the casing of an article of ordnance. While the beam melts and/or vaporizes the surface portion, a flow of gas directed at the melted and/or vaporized surface portion sends it away from the remaining portion of ordnance. After cutting through the casing, the beam then melts and/or vaporizes portions of the encased explosive and the gas stream sends the melted/vaporized explosive away from the ordnance. The beam is continued until it splits the article, after which the encased explosive, now accessible, can be removed safely for recycle or disposal.

70 Claims, 2 Drawing Sheets

METHOD FOR LASER MACHINING EXPLOSIVES AND ORDNANCE

STATEMENT REGARDING FEDERAL RIGHTS

This invention was made with government support under Contract No. W-7405-ENG-36 awarded by the U.S. Department of Energy. The government has certain rights in the invention.

FIELD OF THE INVENTION

The present invention relates generally to laser cutting and more particularly, to the gas-assisted laser cutting of explosives and ordnance.

BACKGROUND OF THE INVENTION

The demilitarization of millions of tons of unexploded ordnance (i.e. articles having an encased explosive charge) is a significant problem in the world today. There are currently two general approaches to demilitarization of ordnance. The first is open burning/open detonation (OB/OD) of the ordnance. The OB/OD approach ensures the destruction of the ordnance but is costly and environmentally intrusive. The second approach involves demilling the ordnance, i.e. cutting through the casing and removing the encased explosive and/or fuse. The demilling approach is generally preferred because it does not result in detonation, and the recovered explosive can be recycled or disposed of safely.

Laser-based demilling methods, both non-thermal and thermal, have been reported. U.S. Pat. No. 6,150,630 to M. D. Perry et al. entitled "Laser Machining of Explosives," hereby incorporated by reference, describes a non-thermal method for machining explosives and demilling. According to this method, an explosive may be machined by irradiation with ultrashort (5 femtoseconds to 100 picoseconds) laser pulses at a high repetition rate (0.01 to over 100 kHz) at wavelengths of about 0.2–12 microns. Each laser pulse converts small portions of the explosive, typically an organic material such as TNT, RDX, and TATB, into ionized plasma with minimal energy loss and minimal shock to the remaining explosive. It is also reported that this method can be used to safely cut through munitions. It is, however, unlikely that this method would make a significant impact in reducing the current stockpile of munitions because of the much greater difficulty in cutting through the metal casing by converting the metal casing into ionized plasma in order to gain access to encased explosive.

Attempts at using thermal laser based cutting methods have been largely unsuccessful. Like the non-thermal method described above, thermal laser based cutting also involves irradiating portions of the munition casing with a laser beam. In contrast, thermal laser cutting methods use a much higher average power beam that easily melts/vaporizes the metal casing. After cutting through the casing, the beam contacts and heats a portion of the explosive. The temperature rise is so rapid that the ignition temperature is rapidly reached and before the beam can be deflected away from the explosive, deflagration and detonation occur.

In view of the dangers associated with the millions of tons of unexploded bombs, mines, detonators, and other ordnance, only rapid methods having a wide margin of safety will make a significant impact in reducing their number and associated dangers. Thus, rapid methods for demilling ordnance remain without detonation and deflagration remain desirable.

Therefore, an object of the present invention is to provide a rapid and relatively safe method of demilling ordnance without detonation and deflagration.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

In accordance with the purposes of the present invention, as embodied and broadly described herein, the present invention includes a method for laser machining a mass of solid explosive. The method includes directing a laser beam to a surface portion of a mass of high explosive to melt and/or vaporize the surface portion, while directing a flow of gas at the melted and/or vaporized surface portion. The gas flow sends the melted and/or vaporized surface portion away from the charge of explosive that remains.

The invention also includes a method of splitting the casing of an article of ordnance having an encased explosive. The method includes directing a laser beam to a surface portion of the casing of an article of ordnance to melt and/or vaporize the surface portion. A stream of gas is directed at melted and/or vaporized surface portion to send the melted and/or vaporized surface portion away from the portion of the article of ordnance that remains. The relative position of the laser beam and the article of ordnance is changed until the laser beam splits the ordnance casing.

The invention also includes a method of cutting an article of ordnance having an encased solid explosive. The method includes directing a laser beam to a surface portion of an article of ordnance casing to melt and/or vaporize the surface portion. A stream of gas is directed at the melted and/or vaporized surface portion to send the melted and/or vaporized surface portion away from the portion of the article of ordnance that remains. The relative position of the laser beam and the article of ordnance is changed until the laser beam splits the ordnance casing. After the casing is split, the laser beam is directed to a surface portion of the encased solid explosive to melt and/or vaporize the surface portion of the solid explosive while directing the flow of gas at the melted and/or vaporized solid explosive to send the melted and/or vaporized explosive away from the portion of the article of ordnance that remains until the laser beam splits the encased solid explosive.

BRIEF DESCRIPTION OF THE DRAWINGS

The accompanying drawings, which are incorporated in and form a part of the specification, illustrate the embodiment(s) of the present invention and, together with the description, serve to explain the principles of the invention. In the drawings.

DETAILED DESCRIPTION OF THE INVENTION

The present invention includes a thermal, laser-based method for machining (i.e. piercing, cutting, and the like)

high explosives and ordnance with little or no risk of deflagration or detonation. The method involves attaching an explosive or article or ordnance to a stage and using a gas-assisted laser to cut through the explosive or article of ordnance. After the explosive or article of ordnance is attached to the stage, a laser beam from the laser melts and/or vaporizes surface portions of the explosive or article while a stream of gas from a gas assist directs the melted/vaporized portions away therefrom. For an article of ordnance, the laser beam moves around the article by moving the laser beam around the article, by using a fixed beam and rotating the article, or by some combination of beam and article movement. If the encased explosive is a liquid, the beam may be discontinued after merely piercing the casing to produce an opening through which the liquid explosive may flow out. If the encased explosive is a solid explosive, the beam should be continued until it at least splits the casing, and preferably until it also splits the encased solid explosive. Afterward, the beam is discontinued and encased explosive, now easily accessible, can be recovered safely for recycle or disposal.

The gas-assisted laser and methods for using a gas-assisted laser to cut through metals and other non-explosive articles are well known. The following patents, which are incorporated by reference herein, provide examples of gas-assisted laser cutting methods and apparatus: U.S. Pat. No. 3,597,578 to A. B. J. Sullivan et al. entitled "Thermal Cutting Apparatus and Method," which issued Aug. 3, 1971; U.S. Pat. No. 3,601,576 to H. Shlafli et al. entitled "Method for Boring Workpieces by Laser Pulses," which issued Aug. 24, 1971; U.S. Pat. No. 3,749,878 to A. B. J. Sullivan et al., entitled "Gas Assisted Laser Cutting Apparatus," which issued Jul. 31, 1973; U.S. Pat. No. 3,965,328 to E. V. Locke entitled "Laser Deep Cutting Process," which issued Jun. 22, 1976; U.S. Pat. No. 4,010,345 to C. M. Banas et al. entitled "Gas Delivery Means for Cutting With Laser Radiation," which issued Mar. 1, 1977; U.S. Pat. No. 5,120,926 to D. A. Marriott entitled "Method and Apparatus for High Speed Laser Cutting," which issued Jun. 9, 1992; U.S. Pat. No. 5,760,368 to Y. Nakata entitled "Laser Beam Method Using an Inactive Gas as the Assist Gas," which issued Jun. 2, 1998; and U.S. Pat. No. 5,734,146 to A. V. La Rocca entitled "High Pressure Oxygen Assisted Laser Cutting Method," which issued Mar. 31, 1998. Laser-based machining is also described in great detail in "Laser Machining, Theory and Practice" by G. Chryssoulouris, Springer-Verlag, New York, 1991, also incorporated by reference. It should be understood that the invention is not a gas-assist laser but a method of using a gas-assist laser to machine explosives and ordnance.

Figure 1A:
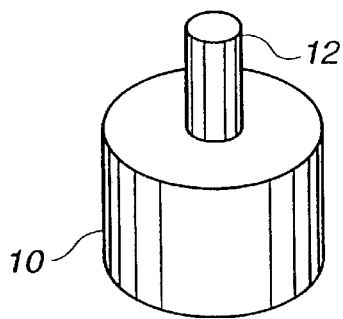
FIGS. 1*a–f* show schematic representations of the method of the invention being applied to an article of ordnance.
Figure 1B:
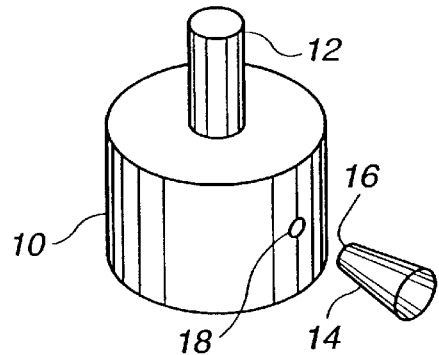
Figure 1C:
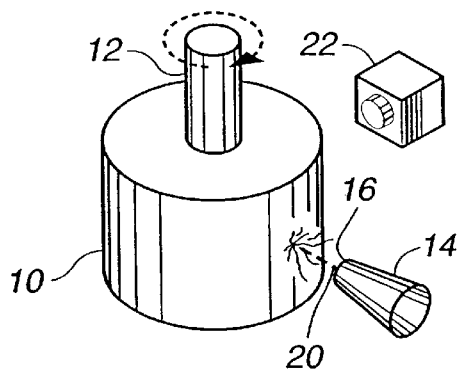
Figure 1D:
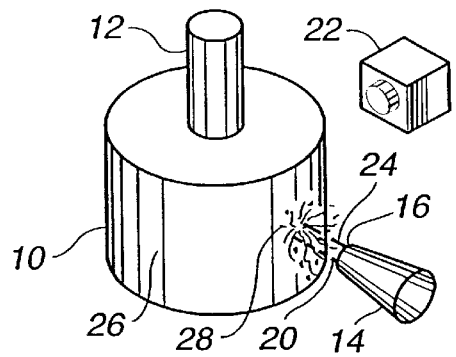
Figure 1E:
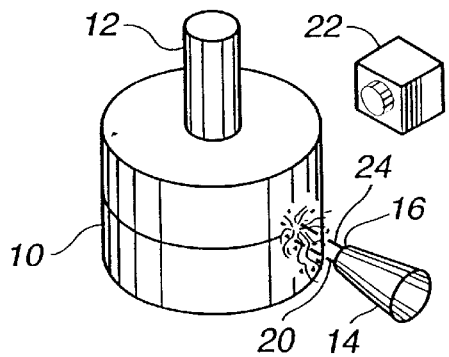
Figure 1F:
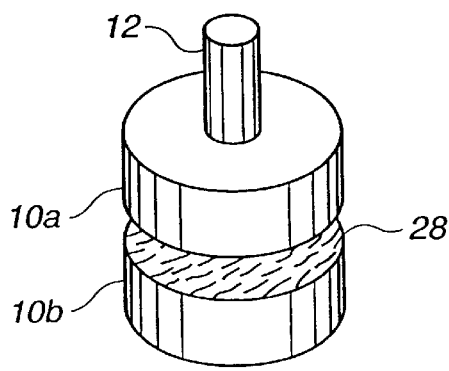

The practice of the invention can be further understood With the accompanying figures. Similar or identical structure is identified using identical callouts. Turning now to the figures, FIGS. 1a–f shows schematically an example of the application of the method of the invention to an article of ordnance having an encased solid high explosive. FIG. 1a shows an article of ordnance 10 mounted to stage 12. For convenience, article 10 is mounted underneath stage 12. FIG. 1b shows article 10 and stage 12, and beam and gas nozzle 14 having laser beam and gas exit 16 that is directed at surface portion 18 of article 10. Turning to FIG. 1c, gas stream 22 is released though exit 18, directed at surface portion 20. The gas stream may be, for example, a stream of compressed air at a pressure of about 60–100 psi. As gas stream flows, stage 12 is caused to rotate at a rate of about 1–3 rotations per minute. As stage 12 rotates, so does article 10. As article 10 rotates, laser check parameters, i.e. laser power of 1 kW, a repetition rate of 100 Hz, a pulse of 1 ms, a dwell time of 0.5 second, and the like, are powered up. Video camera 22 is also powered up and directed at article 10. Next, the laser shutter is opened and, as FIG. 1d shows, laser beam 24 issues from exit 16 at article 10. As laser beam 24 impinges on ordnance casing 26, portions 28 of casing 26 melt and vaporize and are oxidized by air stream 20. There may be a time delay, referred to herein as a dwell time, of about 0–3 seconds between exposure of the laser to consecutive surface portions of the article of ordnance. This time delay provides the time necessary for air stream 20 to direct the melted/vaporized portions 28 of the casing 26 away from the article before exposing the beam to a new surface portion. This way, any melted/vaporized portions do not become attached to the article as they cool and solidify. If casing 26 is relatively thick, article 10 may undergo a complete revolution or more until casing 26 is pierced, after which beam 24 contacts the encased explosive (FIG. 1e). The beam now melts/vaporizes portions of the explosive, which are oxidized by the air stream to water, carbon dioxide, and other combustion products. The gas stream 20 and beam 24 continue until article 10 is split. At this point, the laser shutter is closed to discontinue the laser beam. After a brief waiting period (e.g. 15 minutes), the laser is powered down. As FIG. 1f shows, article 10 is now split into two pieces, 10a and 10b. The article is now inert and the explosive 28 can be removed for destruction or recovery/recycle.

Figure 2:
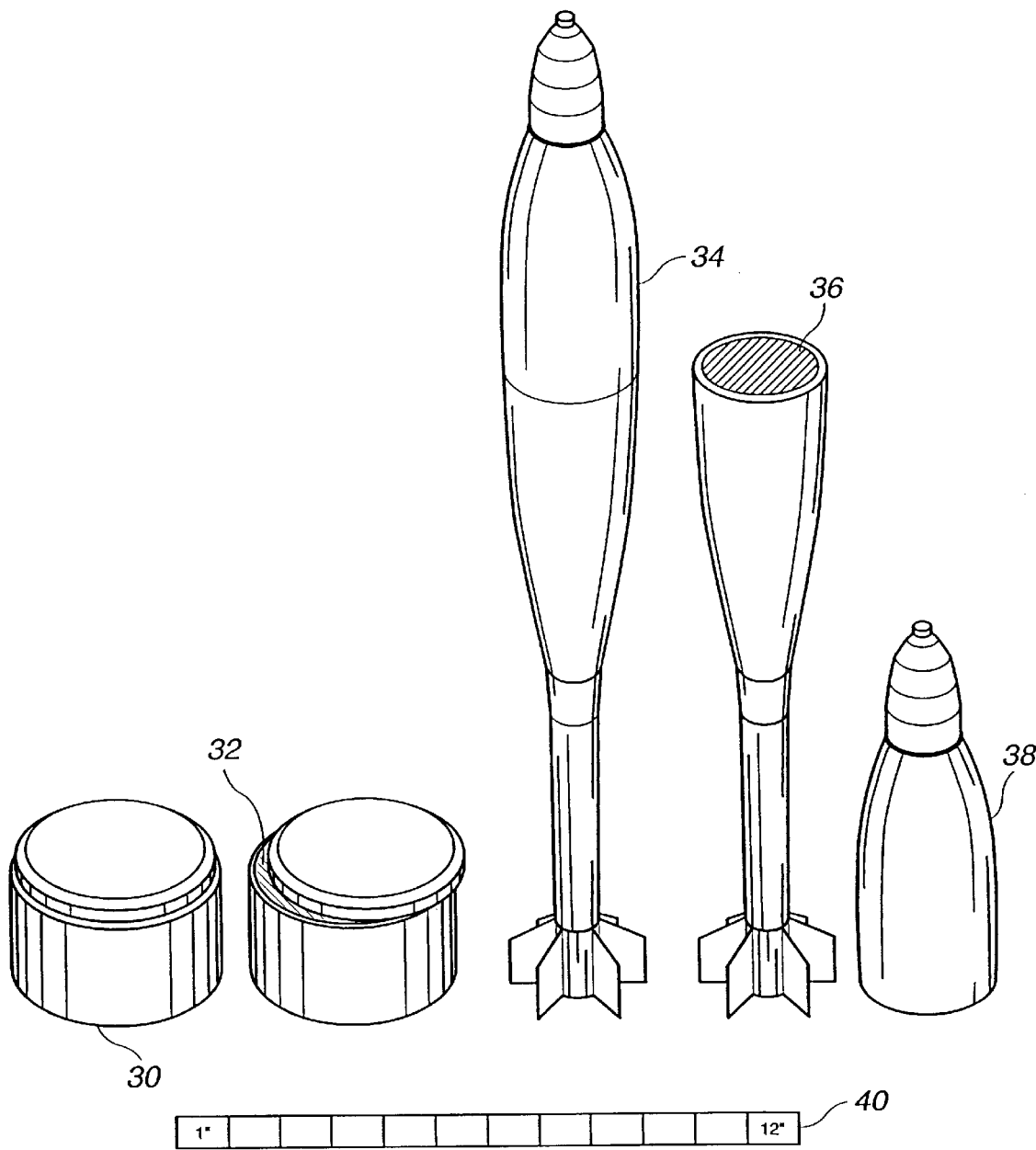
FIG. 2 shows a micrograph of articles of ordnance before and after machining using the method of the invention.

FIG. 2 shows a picture of articles or ordnance after being split using the method of the present invention. In particular, FIG. 2 shows an M75 Antitank Mine split into two pieces, 30 and 32. FIG. 2 also shows an intact 81-mm mortar 34, and another 81-mm mortar after being split into two pieces 36 and 38 using the method of the invention. Tape measure 40 is also included for reference.

Laser systems that can be used with the invention include any laser that produces a laser beam that can melt and/or vaporize portions of the munition casing. These laser systems include continuous wave laser systems, pulsed laser systems, solid state laser systems, and gas laser systems. They also include ultraviolet, near infrared, infrared, and visible laser systems. They also include state crystal lasers such as alexandrite, Ti:sapphire, ruby, and yttrium aluminum garnet lasers doped with Nd, Er, Ho, Tm, Yb, and the like. They also include infrared gas lasers such as carbon dioxide, carbon monoxide, hydrogen fluoride, oxygen-iodine, and the like. They also include ultraviolet laser systems that employ excimers using, for example, ArF, KrF, or XeCl excitation, and the like. They also include near-infrared glass lasers that employ, for example, Er glass and Nd glass. The also include laser systems that employ visible wavelength lasers such as argon ion lasers and metal-vapor lasers.

The invention uses a gas-assist to direct a high-pressure stream of gas to the target area of explosive or article of ordnance being heated by the laser. The gas-assist may be integral with, or separate from, the laser focusing head. It may direct the gas stream collinearly or perpendicularly to the laser beam, but should intersect the laser beam at the surface of the article. A wide variety of gases, both non-reactive and reactive, may be used with the invention. Non-reactive gases, which include nitrogen, argon, and carbon dioxide, to name a few, do not chemically react with materials typically used in the ordnance casing or the encased explosive. Reactive gases, which include air, oxygen or nitrous oxide, chemically react with the melted/vaporized portions of the ordnance casing and with the encased explosive. Oxygen gas, for example, reacts with metal casings to form metal oxides, and with TATB, RDX, and similar explosives to form water, carbon dioxide, carbon monoxide, nitrous oxides and other less oxidized combustion products.

Preferably, the laser system includes optional diagnostics for monitoring the cutting process. The diagnostics may consist of a simple video monitor and include spectroscopic diagnostics such as plasma emission, atomic absorption, Raman, resonant acoustic, or nonresonant acoustic diagnostics.

The laser is adjusted so that the laser beam points at a target area on the article. The laser beam may be focused and delivered to the target area using optical fibers, lenses, prisms, apertures, beam tubes, and the like. The choice of laser beam delivery depends on a variety of parameters that include, for example, the laser wavelength, pulse duration, and the standoff distance. The standoff distance may be maintained using an autofocus laser cutting head that includes a capacitive sensor, a positioning actuator that allows the movement of a focusing lens, and a servo feedback control system. The motion between the laser beam and the explosive/article of ordnance may be controlled in a number of ways. One way is by moving the explosive/article of ordnance using rotational and translational stages while allowing the beam to remain stationary. Another way is to move the laser using translational and rotational stages while allowing the explosive/article of ordnance to remain stationary. A third way involves a combination of explosive/article of ordnance and laser beam positioning. These approaches are described in more detail in aforementioned "Laser Machining, Theory and Practice" by G. Chryssolouris, Springer-Verlag, New York, 1991.

The foregoing description of the invention has been presented for purposes of illustration and description and is not intended to be exhaustive or to limit the invention to the precise form disclosed, and obviously many modifications and variations are possible in light of the above teaching. Commercially available autofocus laser end effectors, for example, could be used instead of the laser end effectors described herein.

The embodiment(s) were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for laser machining a mass of solid explosive, comprising the steps of:
    (a) directing a laser beam to a surface portion of a mass of solid explosive to melt and/or vaporize the surface portion;
    (b) directing a flow of gas at the melted and/or vaporized surface portion to send the melted and/or vaporized surface portion away from the solid explosive that remains.

2. The method of claim 1, where the laser beam comprises a continuous wave laser beam.

3. The method of claim 1, wherein the laser beam comprises a pulsed laser beam.

4. The method of claim 3, wherein the pulsed laser beam comprises a laser beam with a pulse duration of about $10^{-1}$–$10^{-9}$ seconds, an irradiance of about $10^2$–$10^6$ Watts/cm$^2$, and a pulse repetition rate of about 1–1000 Hz.

5. The method of claim 1, wherein the gas comprises a non-reactive gas.

6. The method of claim 5, wherein the non-reactive gas is selected from the group consisting of nitrogen, argon, and mixtures thereof.

7. The method of claim 1, wherein the gas comprises a reactive gas.

8. The method of claim 7, wherein the reactive gas is selected from the group consisting of oxygen, nitrogen oxides, and mixtures thereof.

9. The method of claim 1, wherein the laser beam is generated from a solid state laser.

10. The method of claim 9, wherein the solid state laser is selected from the group consisting of alexandrite laser, titanium:sapphire laser, ruby laser, and yttrium aluminum garnet laser doped with Nd, Er, Ho, Tm, or Yb.

11. The method of claim 1, wherein the laser beam is generated from a gas laser.

12. The method of claim 11, wherein the gas laser is selected from the group consisting of carbon dioxide laser, carbon monoxide laser, hydrogen fluoride laser, and oxygen-iodine laser.

13. The method of claim 1, wherein the laser beam comprises an ultraviolet laser beam.

14. The method of claim 13, wherein the ultraviolet laser beam is generated from an excimer selected from the group consisting of ArF, KrF, and XeCl.

15. The method of claim 1, wherein the laser beam comprises an infrared laser beam.

16. The method of claim 15, wherein the infrared laser beam is generated from an infrared laser selected from the group consisting of carbon dioxide lasers, carbon monoxide lasers, hydrogen fluoride lasers, and oxygen-iodine lasers.

17. The method of claim 1, wherein the laser beam comprises a nearinfrared laser beam.

18. The method of claim 17, wherein the laser beam is generated from Nd glass or Er glass.

19. The method of claim 1, wherein the laser beam comprises a visible laser beam.

20. The method of claim 19, wherein the visible laser beam is generated from a laser selected from the group consisting of argon ion lasers and metal-vapor lasers.

21. The method of claim 1, further comprising the step of rotating the munition while maintaining the position of the laser beam and gas flow as the laser beam melts and/or vaporizes portions of the muntion.

22. The method of claim 1, further comprising the step of rotating the laser beam and gas flow while maintaining the position of the munition as the laser beam melts and/or vaporizes portions of the munition.

23. A method of splitting the casing of an article of ordnance having an encased explosive, comprising the steps of:
    (a) directing a laser beam to a surface portion of the casing of an article of ordnance to melt and/or vaporize the surface portion;
    (b) directing a flow of gas at melted and/or vaporized surface portion to send the melted and/or vaporized surface portion away from the portion of the article of ordnance that remains;
    (c) changing the relative position of the laser beam and the article of ordnance until the laser beam splits the ordnance casing.

24. The method of claim 23, further comprising the step of attaching the article of ordnance to a rotatable stage.

25. The method of claim 23, wherein the laser beam comprises a continuous wave laser beam.

26. The method of claim 23, wherein the laser beam comprises a pulsed laser beam.

27. The method of claim 23, wherein the pulsed laser beam comprises a laser beam with a pulse duration of about $10^{-1}$–$10^{-9}$ seconds, an irradiance of about $10^2$–$10^6$ Watts/cm$^2$, and a pulse repetition rate of about 1–1000 Hz.

28. The method of claim 23, wherein the gas comprises a non-reactive gas.

29. The method of claim 28, wherein the non-reactive gas is selected from the group consisting of nitrogen, argon, and mixtures thereof.

30. The method of claim 23, wherein the gas comprises a reactive gas.

31. The method of claim 30, wherein the reactive gas is selected from the group consisting of oxygen, nitrogen oxides, and mixtures thereof.

32. The method of claim 23, wherein the laser beam is generated from a solid state laser.

33. The method of claim 32, wherein the solid state laser is selected from the group consisting of alexandrite laser, titanium:sapphire laser, ruby laser, and yttrium aluminum garnet laser doped with Nd, Er, Ho, Tm, or Yb.

34. The method of claim 23, wherein the laser beam is generated from a gas laser.

35. The method of claim 34, wherein the gas laser is selected from the group consisting of carbon dioxide laser, carbon monoxide laser, hydrogen fluoride laser, and oxygen-iodine laser.

36. The method of claim 23, wherein the laser beam comprises an ultraviolet laser beam.

37. The method of claim 36, wherein the ultraviolet laser beam is generated from an excimer selected from the group consisting of ArF, KrF, and XeCl.

38. The method of claim 23, wherein the laser beam comprises an infrared laser beam.

39. The method of claim 38, wherein the infrared laser beam is generated from an infrared laser selected from the group consisting of carbon dioxide lasers, carbon monoxide lasers, hydrogen fluoride lasers, and oxygen-iodine lasers.

40. The method of claim 23, wherein the laser beam comprises a near-infrared laser beam.

41. The method of claim 40, wherein the laser beam is generated from Nd glass or Er glass.

42. The method of claim 23, wherein the laser beam comprises a visible laser beam.

43. The method of claim 42, wherein the visible laser beam is generated from a laser selected from the group consisting of argon ion lasers and metal-vapor lasers.

44. The method of claim 23, wherein the explosive is selected from the group consisting of solid explosives, liquid explosives, and combinations thereof.

45. The method of claim 23, wherein said step of changing the relative position of the laser beam and the article of ordnance comprises rotating the article of ordnance.

46. The method of claim 23, wherein said step of changing the relative position of the laser beam and the article of ordnance comprises moving the laser beam around the article of ordnance.

47. The method of claim 23, further comprising the step of removing the explosive from the split casing of the munition.

48. A method of cutting an article of ordnance having an encased solid explosive, comprising the steps of:
  (a) directing a laser beam to a surface portion of an article of ordnance casing to melt and/or vaporize the surface portion;
  (b) directing a flow of gas at the melted and/or vaporized surface portion to send the melted and/or vaporized surface portion away from the portion of the article of ordnance that remains;
  (c) changing the relative position of the laser beam and the article of ordnance until the laser beam splits the ordnance casing;
  (d) directing the laser beam to a surface portion of the encased solid explosive to melt and/or vaporize the surface portion of the solid explosive while directing the flow of gas at the melted and/or vaporized solid explosive to send the melted and/or vaporized explosive away from the portion of the article of ordnance that remains until the laser beam splits the encased solid explosive.

49. The method of claim 48, further comprising the step of attaching the article or ordnance to a rotatable stage.

50. The method of claim 48, wherein the laser beam comprises a continuous laser beam.

51. The method of claim 48, wherein the laser beam comprises a pulsed laser beam.

52. The method of claim 48, wherein the pulsed laser beam comprises a laser beam with a pulse duration of about $10^{-1}$–$10^{-9}$ seconds, an irradiance of about $10^2$–$10^6$ Watts/cm$^2$, and a pulse repetition rate of about 1–1000 Hz.

53. The method of claim 48, wherein the gas comprises a non-reactive gas.

54. The method of claim 48, wherein the non-reactive gas is selected from the group consisting of nitrogen, argon, and mixtures thereof.

55. The method of claim 48, wherein the gas comprises a reactive gas.

56. The method of claim 48, wherein the reactive gas is selected from the group consisting of oxygen, nitrogen oxides, and mixtures thereof.

57. The method of claim 48, wherein the laser beam is generated from a solid state laser.

58. The method of claim 48, wherein the solid state laser is selected from the group consisting of alexandrite laser, titanium:sapphire laser, ruby laser, and yttrium aluminum garnet laser doped with Nd, Er, Ho, Tm, or Yb.

59. The method of claim 48, wherein the laser beam is generated from a gas laser.

60. The method of claim 59, wherein the gas laser is selected from the group consisting of carbon dioxide laser, carbon monoxide laser, hydrogen fluoride laser, and oxygen-iodine laser.

61. The method of claim 48, wherein the laser beam comprises an ultraviolet laser beam.

62. The method of claim 61, wherein the ultraviolet laser beam is generated from an excimer selected from the group consisting of ArF, KrF, and XeCl.

63. The method of claim 48, wherein the laser beam comprises an infrared laser beam.

64. The method of claim 63, wherein the infrared laser beam is generated from an infrared laser selected from the group consisting of carbon dioxide lasers, carbon monoxide lasers, hydrogen fluoride lasers, and oxygen-iodine lasers.

65. The method of claim 48, wherein the laser beam comprises a near-infrared laser beam.

66. The method of claim 65, wherein the near-infrared laser beam is generated using Nd glass or Er glass.

67. The method of claim 48, wherein the laser beam comprises a visible laser beam.

68. The method of claim 67, wherein the visible laser beam is generated from a laser selected from the group consisting of argon ion lasers and metal-vapor lasers.

69. The method of claim 48, wherein the step of changing the relative position of the laser beam and article of ordnance comprises rotating the muntion relative to the laser beam and gas flow comprises rotating the munition.

70. The method of claim 48, wherein the step of changing the relative position of the laser beam and article of ordnance comprises moving the laser beam around the article of ordnance.

* * * * *